United States Patent Office 3,532,262
Patented Oct. 6, 1970

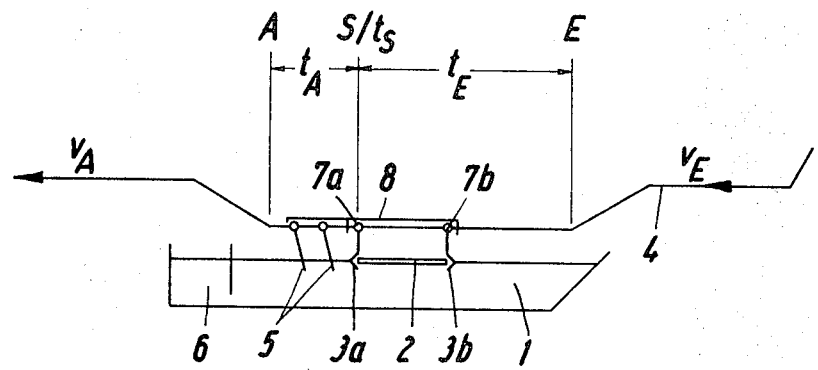
Fig. 1
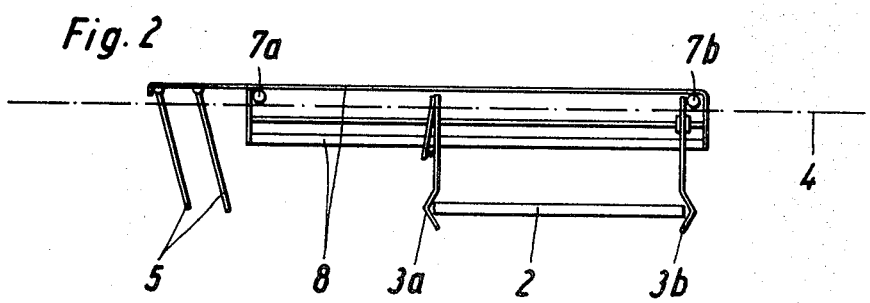
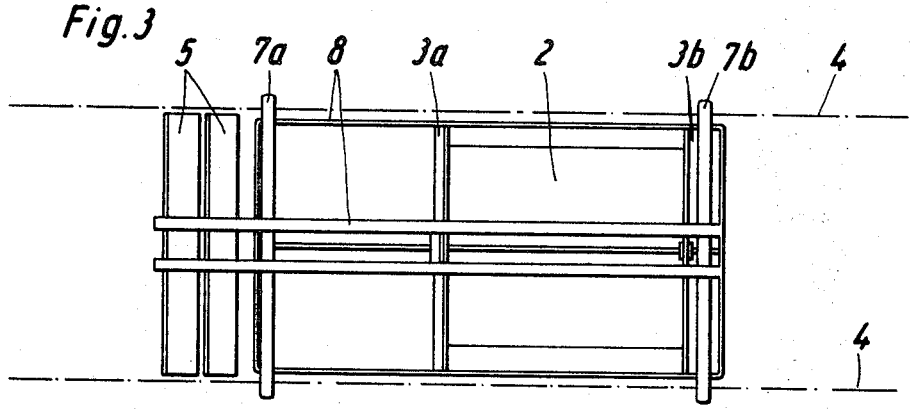

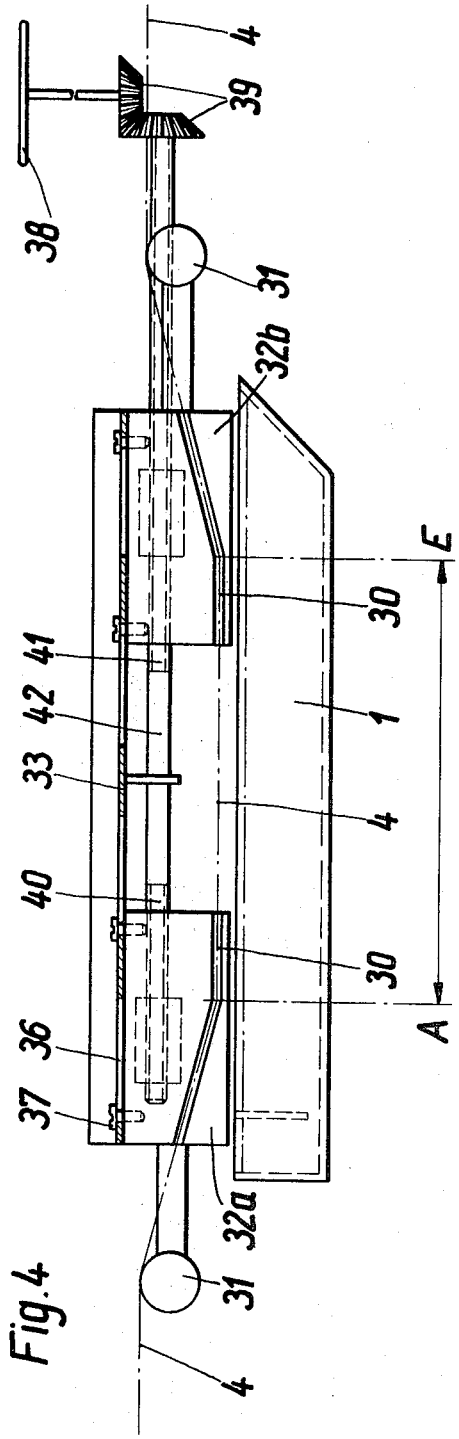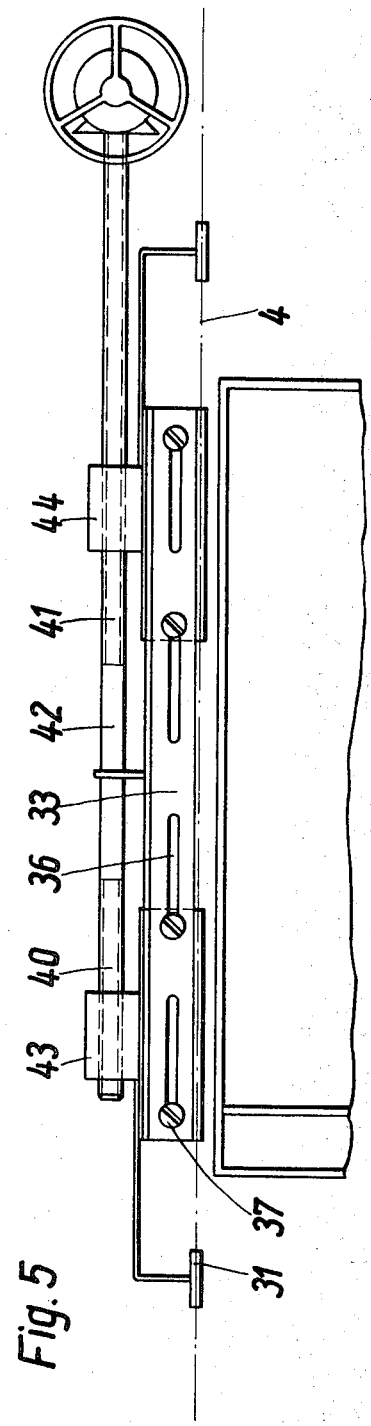

3,532,262
DRAG-SOLDERING METHOD AND MACHINE
Günther Laubmeyer and Marius Smits, Arolsen, Waldeck, Germany, assignors to Zeva Elektrijzitaetsgesellschaft Smits and Laubmeyer KG., Arolsen, Waldeck, Germany
Filed Nov. 3, 1967, Ser. No. 680,566
Claims priority, application Germany, Nov. 3, 1966, Z 12,507
Int. Cl. B23k 1/08
U.S. Cl. 228—37    10 Claims

ABSTRACT OF THE DISCLOSURE

A method and machine for drag soldering a printed circuit board by adjustably controlling the entrance speed of the board into a solder bath, the removal speed of the board from the solder bath, the location of the board in the solder bath where the speed of the board changes from entrance speed to removal speed, the period of time the board is stopped in the solder bath, and the location in the solder bath where the board is stopped.

---

This invention relates to dip-soldering and more particularly to a method and apparatus where the printed circuit panel is floated at a certain rate over a molten solder.

This well known modification of the dip-soldering process which will be designated "drag-solding," is apt to produce thickened soldered joints, the so-called "icicles." Particularly in miniaturized circuits, such thickened joints may cause short-circuiting between the conductors.

It is a principal object of the invention to provide a method which prevents such bridges and undesired connections and makes it possible to obtain reliably soldered miniaturized circuits.

It is another object of the invention to provide a solder machine suitable for carrying out said method.

Other objects and advantages will be apparent from a consideration of the specification and claims.

In accordance with the invention, the speed of floating the panel into the soldering bath, the speed of removing the panel from the bath, and the dwell time of the panel on the surface of the bath, are all made adjustable independently from each other.

According to a further embodiment of the invention, the removal speed dependent upon the exit angle to the surface of the soldering bath are so adjusted that the component of the vertical removal speed is equal to, or smaller than, the drain rate of the liquid solder from the panel. Other conditions like exit angle, temperature, etc. being equal, said drain rate depends on the surface of the panel, particularly on its roughness, its oxidation degree, and its contaminations.

The method of the invention ensures a considerable saving of solder. Also on a relatively large surface, the solder can be deposited evenly in such a thin layer as is just still permissible. The solder loss is reduced to a minimum, and the formation of "icicles" is excluded. Also for very closely spaced conductors with distances of 0.5 mm. and less, bridge formation and "shorts" are substantially completely avoided.

The novel features of the invention, as well as additional objects and advantages, will be understood more fully from the following description when read in connection with the accompanying drawing, in which:

FIG. 1 is a diagrammatic view of an apparatus suitable for carrying out the invention;

FIG. 2 is an enlarged view of the work holder of the apparatus;

FIG. 3 is a top view of the work holder of FIG. 2;

FIGS. 4 and 5 are a side view and a top view of a modified form of the invention.

Figure 6:
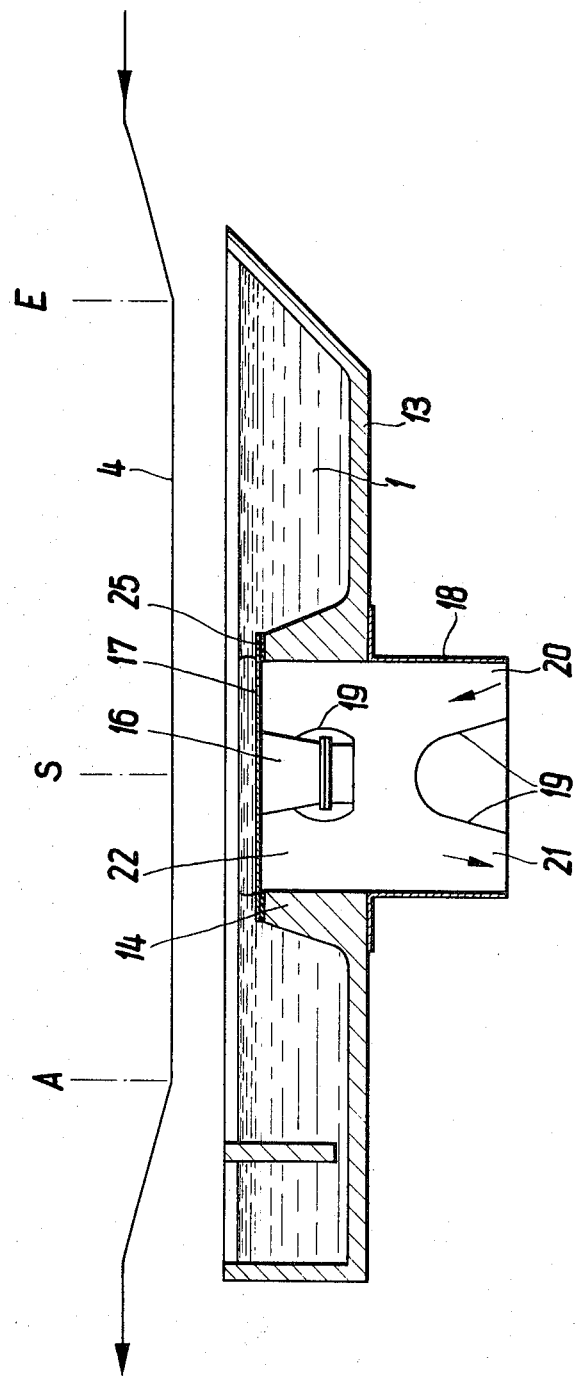
FIG. 6 is a longitudinal section of a further embodiment.

Referring to the drawing, an apparatus in accordance with the present invention includes a holder for carrying the panel 2 over the surface of the soldering bath 1. Conveyor chains 4 for the holder are provided at both sides above the molten solder. The holder itself consists of a frame 8 supported on transverse bars 7a, 7b which connect the two chains 4. Bands or bars 3a, 3b, at least one of which is resiliently arranged, are suspended from the frame; the panel 2 can be readily placed between said bars for easy removal.

In the position shown in the drawing, the panel 2 has already been lowered on the surface of the molten solder and has been advanced to the stop position S. Place and timing of said stop position are adjustable. The stop period depends particularly on the temperature of the soldering bath and will be normally in the range of fractions of a second to about 10 seconds and allows of using a short soldering bath 1. The stop period may even become practically zero and constitutes then only the switch from the entrance to the removal speed.

According to another embodiment of the invention, the tracks guiding the chains can be divided in the range of the drag soldering path, whereby the sections can be made displaceable in the direction of the chain motion; these sections may be adjustably spaced, e.g., by means of two opposite threads or the like, so as to shorten or lengthen the drag path proper for producing optimum soldering effects. In this way, we obtain good adjustability of the machine for soldering printed circuits with projecting leads or other components.

In the drawing, the entrance speed is designated with the reference symbol $V_E$ and the removal speed with $V_A$. A great entrance speed may be employed. Generally, the holder with the printed circuit assembly, on its way to the soldering station, will pass first a fluxing station, where flux may be applied, e.g., as foam, and subsequently an infrared drying station. For this travel, the conveyor speed must be, of course, adapted to the required drying time of the flux. On the other hand, the entrance speed into the soldering tank can be adjusted, still during the immersion of the panel in the molten solder until the stop position is reached, to such a rate as to ensure a maximum throughput of panels. The required minimum contact time of work panel with the molten solder can be exactly controlled by means of the stop period.

The removal speed $V_A$ is adjusted independently. Taking into account the angle of removal, the removal speed is controlled in relation to the drain rate of the liquid solder from the printed circuit panel, whereby the vertical component of the removal speed must be at most equal to or preferably smaller than the drain rate. Compliance with this condition contributes substantially to the success of our invention.

In the drawing, the point E designates the entrance point of the printed circuit panel on the surface of the molten solder and thereby the beginning of the soldering operation; S is the stop point, and A the exit point. The stop point is displaceable between A and E, and the stop period $t_S$ is adjustable. The soldering time proper is constituted by the travel time $t_E$ from E to S, the stop period $t_S$, which may also be called dwell time, and the travel time $t_A$ from point S to point A.

At least two blades 5 are flexibly suspended from the conveyor chain 4 at the front of the holder and/or mounted at the front side of the holder in the direction of movement of the chains; said blades are arranged to wipe off, during the transport of the work panel, oxides and dross from the surface of the soldering bath in front of the panel. At the end of the soldering bath, the wiped-off dross is passed into a melting-out zone 6 in which the molten solder communicates with the melt of the soldering bath proper. In this way, solder particles entrained with the dross are returned to the soldering bath, and only the dross which is relatively free of solder is ejected at the end of the tank into a separate container.

It is also possible to perform the switch from entrance speed to removal speed practically instantaneously. This is the case especially when the sum of the entrance travel time $t_E$ and the removal time $t_A$ already make up the required total soldering time which depends essentially on the temperature and is also adjustable as a function thereof. Such adjustment can be carried out by variation of the entrance and/or removal travel time and corresponding displacement of the switch point S. In this case, the soldering operation is performed without dwell time.

FIGS. 4 and 5 show, for instance, the division of the tracks guiding the chains in the range of the drag soldering path, whereby the two sections can be made displaceable in the direction of the chain motion, thus rendering an adjustment of the length of the drag soldering path possible.

According to FIGS. 4 and 5 the chain guide is divided into two sections 32a and 32b, each of them consisting of a rectangular hollow section. A guide slot 30 for the guide chain 4 is cut into one side of said hollow sections. Said two guide sections 32a and 32b are displaceable relative to each other, thereby allowing to shorten or lengthen the drag path proper (A–E). For this purpose the two guide sections 32a and 32b are guided on a bar 33. The bar has slots 36 for screws 37 passing therethrough and engaging in said guide sections and serving to lock the guide sections 32a and 32b in the respectively adjusted position. A gear wheel 31 is mounted at a distance on each outer end of the guide sections, said gear wheel providing for the chain to be fed correctly into and moved out of the guide slots in the guide sections in every position of said sections.

As can readily be seen the adjustment of the guide sections 32a and 32b relative to each other can be made by hand. The embodiment shown in FIGS. 4 and 5 comprises, in addition, a screw drive driven by a hand wheel 38 through a bevel-gear drive 39. Said screw drive comprises two sprindles 40, 41 with contrarotating threads on the driven shaft 42, said spindles cooperating with the nut threads 43 and 44 in the guide sections 32a and 32b.

It is known that by means of ultrasonics a deoxidizing influence can be exerted on the soldered joint, as is otherwise obtainable only by means of a flux. The invention presents an ideal possibility to apply this method in that the ultrasonic transmitter is mounted below the stop range of the panel. Preferably the bottom of the soldering bath tank is raised whereby the height of the bath level within the region of the ultrasonic waves can be reduced, preferably down to 3–15 mm. Thus a most intensive supersonic energy is generated within the region of the bath surface and the printed circuit panel so that the use of a flux can be entirely dispensed with, or else soft-acting fluxes are sufficient which would not cause danger of corrosion of the soldering joints.

FIG. 6 is a sectional view of such an embodiment of the invention.

In order to avoid repetitions only the conveyor chains 4 without the holder and the circuit panel is shown in FIG. 6. The tank 13 of the soldering bath 1 differs from the tank according to FIG. 1 in that the bottom of the tank for the soldering bath 1, which, for example, is made by casting, is raised up within the region of the stop area S. The rectangular hollow space 22 is covered on its upper side by a plate 17 permeable to ultrasonics. The surface of said plate 17 is to lie, when the tank 13 is filled with the molten soldering bath at the desired level, about 3–15 mm. below the bath level. Preferably said plate is made from a metal practically not tinnable, for example, high grade steel, titanium or alloys thereof such as titanium-beryllium. The plate 17 is secured to the wall portion 14 by means of a heat-resisting sealing member 25.

E.g. three ultrasonic transmitters 16 are mounted underneath said cover plate 17 in such a manner that their sound transmitting surfaces are in close contact with said cover plate 17. Thereby the soldering bath in the region of the stopping point S of the circuit panel floating on said bath region are nearly directly energized by ultrasonics when the ultrasonic transmitters are energized.

As is indicated in FIGS. 6 and 7 the space 22 for ultrasonic transmitters 16 is extended down towards the bottom by a chimney-like part 18. Deflector plates 19 are provided for a suitable cooling medium such as cooling air to enter at 20 and leave at 21, thus cooling the ultrasonic transmitters in order to keep the piezoelectric crystals below the critical temperature. This is of great importance because the ultrasonic transmitters are, in addition to their self-heating, endangered by the heat of the adjacent soldering bath 1.

The advantages of the novel soldering method may be summed up as follows:

(1) Possibility of quick adaptation to any soldering problem;

(2) Absolutely "icicle" free and bridge-free soldering even for very closely spaced conductors;

(3) No irregular solder aggregation on conductors or large copper areas;

(4) Unobjectionable soldering results in miniaturized techniques;

(5) Uniformly high soldering quality which is entirely unaffected by the operator;

(6) Small solder deposits;

(7) Minimum solder loss.

We claim:

1. A machine for drag soldering a printed circuit board comprising tank means for holding a fixed stagnant soldering bath at a predetermined level, generally horizontally moving conveyor means extending above said bath, holding means for supporting a circuit board for movement by the conveyor means, said conveyor means including means for dipping the board into said fixed, stagnant soldering bath, to advance the board in continuous contact with said bath and to remove said board from said bath, said conveyor means also including means for moving said board into said bath and for removing said board from the bath at predetermined angles and rates of speed, said dipping and removing speeds being individually and selectively adjustable.

2. The invention defined in claim 1, wherein said conveyor means also includes means for moving said board through said bath at two different rates of speed, and including means for changing the rate of speed at a plurality of predetermined locations during said movement through the bath.

3. A machine for drag soldering a printed circuit board comprising tank means for holding a fixed, stagnant soldering bath at a predetermined level, generally horizontally moving conveyor means extending above said bath, holding means for supporting a circuit board for movement by the conveyor means, said conveyor means including means for dipping the board at an angle into said fixed stagnant soldering bath, to advance the board in continuous contact with said bath and to remove said board from said bath at an angle, said conveyor means also including means for stopping movement of a circuit board while in contact with said bath for an adjustable predetermined period of time.

4. The invention defined in claim 3, wherein said conveyor means also includes means for stopping said movement of a circuit board at an adjustably predetermined location in said bath.

5. A machine for drag soldering a printed circuit board comprising tank means for holding a fixed stagnant soldering bath at a predetermined level, generally horizontally moving conveyor means extending above said bath, holding means for supporting a circuit board for movement by the conveyor means, said conveyor means including means for dipping the board at an angle into said fixed stagnant soldering bath, to advance the board in continuous contact with said bath and to remove said board from said bath at an angle, said conveyor means also including longitudinally extending track means for controlling the path of a circuit board into and out of said bath, said track means including two longitudinally adjustable sections disposed in horizontally spaced relationship for controlling the length of the drag path of the board in said bath.

6. The invention defined in claim 5, wherein at least one of said longitudinally adjustable sections includes means for guiding movement of a circuit board out of said bath by said conveyor means at a rate of speed having a vertical component less than the drain rate of solder from said board.

7. The invention defined in claim 4, wherein said tank means includes ultrasonic transmitter means positioned in said bath below a predetermined location for stopping a circuit board.

8. The invention defined in claim 7, wherein said tank means includes a horizontal bottom wall portion elevated above the level of the remainder of the bottom of the tank means, said ultrasonic transmitter means being positioned in coacting relationship below said elevated bottom wall portion.

9. The invention defined in claim 1, wherein said conveyor means includes means for guiding movement of a circuit board out of said bath by said conveyor means at a rate of speed having a vertical component less than the drain rate of solder from said board.

10. The invention defined in claim 3, wherein said conveyor means also includes means for guiding movement of a circuit board out of said bath by said conveyor means at a rate of speed having a vertical component less than the drain rate of solder from said board.

References Cited
UNITED STATES PATENTS

| | | | |
|---|---|---|---|
| 3,039,185 | 6/1962 | Oates | 29—503 |
| 3,041,991 | 7/1962 | Dvorak | 228—43 |
| 3,053,215 | 9/1962 | Guty | 228—39 |
| 3,439,854 | 4/1969 | Walker | 228—37 |
| 2,770,875 | 10/1956 | Zimmerman | 228—39 |
| 3,303,983 | 2/1967 | Patrick et al. | 29—503 |

JOHN F. CAMPBELL, Primary Examiner

R. J. CRAIG, Assistant Examiner

U.S. Cl. X.R.

228—39, 43